United States Patent
Ivchenko et al.

(10) Patent No.: US 12,198,241 B1
(45) Date of Patent: Jan. 14, 2025

(54) SYSTEMS AND METHODS TO GENERATE SYNTHETIC LIP SYNCHRONIZATION HAVING FAITHFUL TEXTURES

(71) Applicant: Amazon Technologies, Inc., Seattle, WA (US)

(72) Inventors: Anton Ivchenko, Glendale, CA (US); Naveen Sudhakaran Nair, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 220 days.

(21) Appl. No.: 18/061,657

(22) Filed: Dec. 5, 2022

(51) Int. Cl.
| | |
|---|---|
| *G06T 13/20* | (2011.01) |
| *G06T 3/02* | (2024.01) |
| *G06T 3/18* | (2024.01) |
| *G06T 13/40* | (2011.01) |
| *G06T 19/20* | (2011.01) |

(52) U.S. Cl.
CPC .............. *G06T 13/205* (2013.01); *G06T 3/02* (2024.01); *G06T 3/18* (2024.01); *G06T 13/40* (2013.01); *G06T 19/20* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 2016/0364904 A1* | 12/2016 | Parker | G06F 3/038 |
| 2019/0109804 A1* | 4/2019 | Fu | A63F 13/215 |
| 2022/0172710 A1* | 6/2022 | Brady | G06N 3/08 |
| 2024/0038271 A1* | 2/2024 | de Juan | G06V 40/50 |

OTHER PUBLICATIONS

Averbuch-Elor, H., et al. Bringing Portraits to Life. ACM Transactions on Graphics, vol. 36, No. 4, Article 196. Publication date: Nov. 2017. pp. 1-13. URL: https://www.cs.tau.ac.il/~dcor/articles/2017/elor.pdf.

Bear, Helen L. and Richard Harvey. Phoneme-to-Viseme Mappings: the Good, the Bad, and the Ugly. Speech Communication, Special Issue on AV Expressive Speech. arXiv: 1805.02934v1 [cs.CV]. May 8, 2018. 46 pages. URL: https://arxiv.org/abs/1805.02934.

Bregler, C., et al. Video Rewrite: Driving Visual Speech with Audio. ACM SIGGRAPH 97. Jan. 1997. pp. 1-8, URL: https://www.researchgate.net/publication/220720338_Video_Rewrite_Driving_Visual_Speech_with_Audio.

(Continued)

*Primary Examiner* — Tapas Mazumder
(74) *Attorney, Agent, or Firm* — Athorus, PLLC

(57) ABSTRACT

Systems and methods to generate synthetic lip synchronization may generate source facial keypoints based on a source video, generate target facial keypoints based on a target audio, determine distances between the source facial keypoints and target facial keypoints, and transform or warp the source facial keypoints and associated surfaces to the target facial keypoints. In this manner, target video having synthetic lip synchronization that matches the target audio may be generated, and the target video may substantially preserve or maintain surface textures or features from the source video in the target video, thereby generating natural and believable synthetic lip synchronization corresponding to the target audio.

20 Claims, 8 Drawing Sheets

(56) References Cited

OTHER PUBLICATIONS

Dong, X., et al. Supervision-by-Registration: An Unsupervised Approach to Improve the Precision of Facial Landmark Detectors. Proceedings of the IEEE Conference on Computer Vision and Pattern Recognition (CVPR) 2018. pp. 360-368. URL: https://openaccess.thecvf.com/content_cvpr_2018/papers/Dong_Supervision-by-Registration_An_Unsupervised_CVPR_2018_paper.pdf.

Edwards, P., et al. Jali: An Animator-Centric Viseme Model for Expressive Lip Synchronization. SIGGRAPH '16 Technical Paper, Jul. 24-28, 2016, Anaheim, CA, 11 pages, ISBN: 978-1-4503-4279-7/16/07. URL: https://www.dgp.toronto.edu/~elf/JALISIG16.pdf.

Grishchenko, I., et al. Attention Mesh: High-fidelity Face Mesh Prediction in Real-time. CVPR Workshop on Computer Vision for Augmented and Virtual Reality, Seattle, Wa, USA, 2020. arXiv:2006.10962v1 [cs.CV] Jun. 19, 2020. pp. 1-4. URL: https://arxiv.org/abs/2006.10962.

Karras, T., et al. Alias-Free Generative Adversarial Networks. 35th Conference on Neural Information Processing Systems (NeurIPS 2021). arXiv:2106.12423v4 [cs.CV] Oct. 18, 2021. pp. 1-31. URL: https://arxiv.org/abs/2106.12423.

Kwatra, Vivek, "LipSync3D: Personalized 3D Talking Faces from Video using Pose and Lighting Normalization", YouTube, www.youtube.com, Jun. 8, 2021, 4:59, URL: https://www.youtube.com/watch?v=L1StbX9OznY, obtained Nov. 2, 2022, 5 pages.

Lahiri, A., et al. LipSync3D: Data-Efficient Learning of Personalized 3D Talking Faces from Video Using Pose and Lighting Normalization. IEEE CVPR 2021. arXiv:2106.04185v1 [cs.CV] Jun. 8, 2021. 16 pages. URL: https://arxiv.org/abs/2106.04185.

Lombardi, S., et al. Mixture of Volumetric Primitives for Efficient Neural Rendering. ACM Transactions on Graph., vol. 40, No. 4, Article 59. Publication date: Aug. 2021. 13 pages. arXiv:2103.01954v2[cs.GR] May 6, 2021. URL: https://arxiv.org/abs/2103.01954.

Medina, S., et al. Speech Driven Tongue Animation. IEEE/CVF Conference on Computer Vision and Pattern Recognition (CVPR), 2022. pp. 20406-20416. URL: https://openaccess.thecvf.com/content/CVPR2022/papers/Medina_Speech_Driven_Tongue_Animation_CVPR_2022_paper.pdf.

Tymchyshyn, Vitalii B. and Andrii V. Khlevniuk. (2019). Workbook on Mapping Simplexes Affinely. Bogolyubov Institute for Theoretical Physics, National Academy of Sciences, Aug. 10, 2019, Metrolohichna St. 14-b, Kyiv 03680, Ukraine, pp. 1-28, DOI: 10.13140/RG.2.2.16346.18881, URL: https://www.researchgate.net/publication/332971934_Workbook_on_mapping_simplexes_affinely.

Tymchyshyn, Vitalii B. and Andrii V. Khlevniuk. Beginner's Guide to Mapping Simplexes Affinely. Bogolyubov Institute for Theoretical Physics, National Academy of Sciences, Aug. 11, 2019, Metrolohichna St. 14-b, Kyiv 03680, Ukraine, pp. 1-17, DOI:10.13140/RG.2.2.16346.18881 URL: https://www.researchgate.net/publication/332410209_Beginner's_guide_to_mapping_simplexes_affinely.

Zheng, Y., et al. General Facial Representation Learning in a Visual-Linguistic Manner. arXiv:2112.03109v3 [cs.CV] Apr. 1, 2022. pp. 1-16. URL: https://arxiv.org/abs/2112.03109.

\* cited by examiner

SYSTEMS AND METHODS TO GENERATE SYNTHETIC LIP SYNCHRONIZATION HAVING FAITHFUL TEXTURES

BACKGROUND

Movies, television shows, or other video content may be created with an audio track in a first, original language. In order to broaden the appeal of such videos, the audio tracks associated with such videos may be transcribed to different languages, and/or additional audio tracks in different languages may be generated and dubbed or substituted for the audio track in the first, original language. However, audio dubbing of various different languages results in a mismatch between characters' face and mouth movements and the audio tracks, which may be distracting or unappealing to viewers. Accordingly, there is a need for systems and methods to generate synthetic lip synchronization for various audio tracks in different languages that also maintain faithful textures of characters' faces and mouths, thereby resulting in more natural and appealing video content for viewers in a variety of different languages.

DETAILED DESCRIPTION

Figure 1:
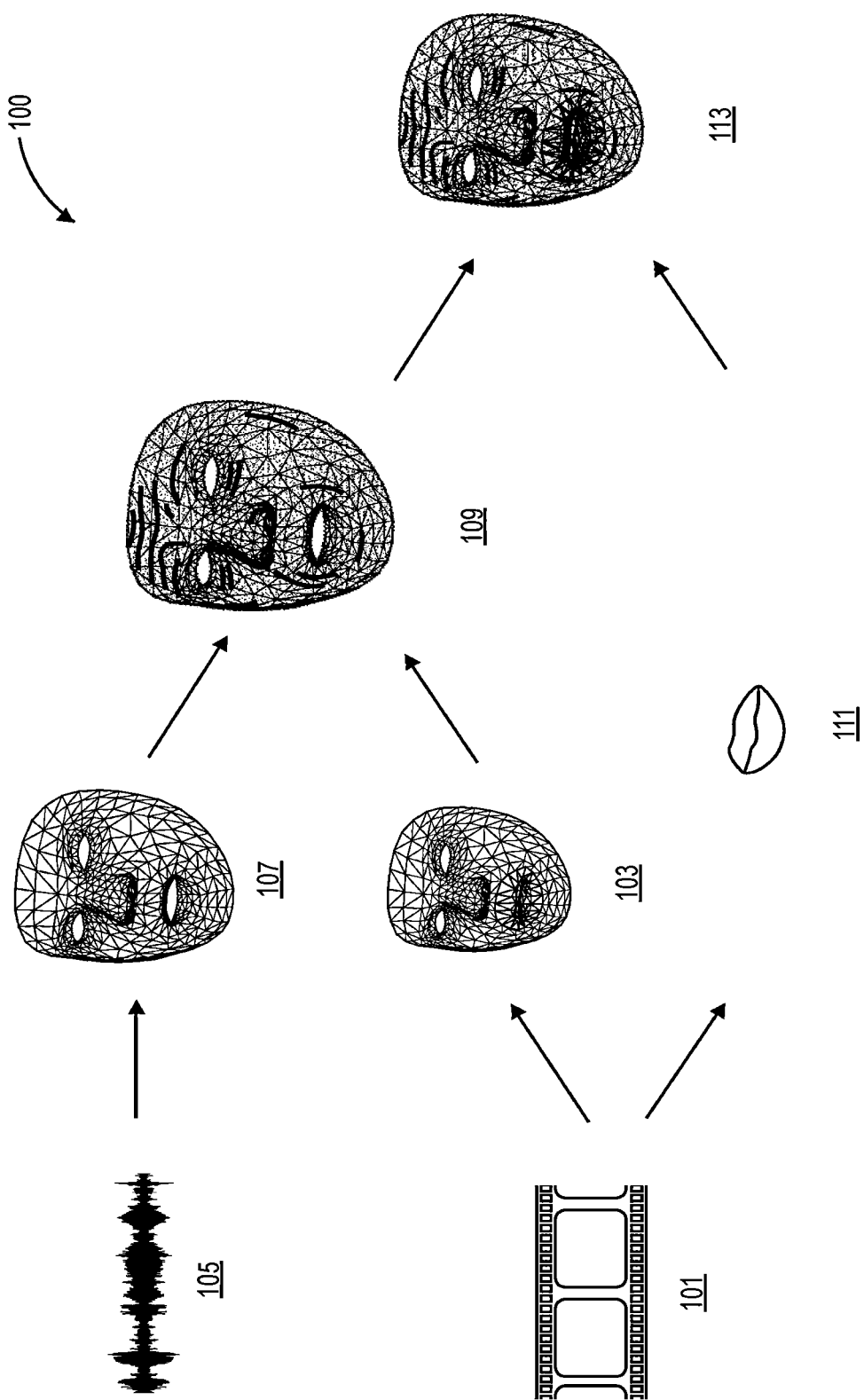
FIG. 1 is a schematic diagram of an example synthetic lip synchronization generation process, in accordance with implementations of the present disclosure.

As is set forth in greater detail below, implementations of the present disclosure are directed to systems and methods to generate synthetic lip synchronization having faithful surface textures for various types of video content in various different languages.

In some conventional methods, synthetic lip synchronization for video content in various different languages may be generated by building a source library of a multitude of image frames of a face or mouth of an actor, person, or character for various different spoken sounds, e.g., a source library of visemes. Then, based on a desired shape or position of a face or mouth of an actor, the source library of visemes may be searched to identify a matching shape or position of the face or mouth. Further, based on a target audio track and associated desired shapes and positions of a face or mouth, the best matching frames may be selected and compiled to generate synthetic lip synchronization.

However, for such conventional methods to work well, a sufficiently large source library of visemes for individual actors, persons, or characters must be created and maintained. Further, the source library of visemes must generally include various different poses and orientations of a face or mouth of an actor, person, or character in order to be able to select, compile, and generate synthetic lip synchronization that appears to match the target audio track. Thus, such conventional methods may be difficult and expensive to build and maintain, and may not generate natural and believable synthetic lip synchronization due to the limitations described above.

In other conventional methods, synthetic lip synchronization for video content in various different languages may be generated by utilizing machine learning methods, algorithms, or techniques, such as generative adversarial networks (GANs), that teach a machine learning model to predict or identify a shape or position of a face or mouth of an actor, person, or character based on a target audio track. The GANs may receive source video content and a target audio track as machine learning inputs, and may generate predicted shapes and positions of a face or mouth of an actor, person, or character as machine learning outputs. Then, the synthetic lip synchronization may be generated based on the predicted shapes and positions of a face or mouth from the machine learning outputs of the GANs.

However, such conventional machine learning methods using GANs may be very computationally expensive. In addition, the generated synthetic lip synchronization may not maintain surface textures of a face or mouth of an actor, person, or character, may add new or additional surface textures or artifacts to the face or mouth, may result in blurred or low resolution image frames that are no longer photorealistic, and/or may result in jittery or uneven movements of portions of a face or mouth. Further, in order to attempt to generate photorealistic surface textures of a face or mouth, additional computationally expensive fine-tuning models may be applied to the generated synthetic lip synchronization. However, such fine-tuning models may negatively affect the quality of synthetic lip synchronization while attempting to improve the quality of surface textures due to competing loss functions of the applied models. Thus, such conventional methods may be very computationally expensive, and may not generate natural and believable synthetic lip synchronization due to the limitations described above.

In example embodiments in accordance with implementations of the present disclosure, synthetic lip synchronization may be generated that maintains faithful surface textures of the original source video content. For example, a source face model may be generated based on a source video in a first language having a plurality of frames, and the source face model may include a corresponding plurality of frames, each frame of the source face including a first plurality of facial keypoints or landmarks. In addition, a target face model may be generated based on a target audio track in a second language having an associated plurality of frames, and the target face model may include a corresponding plurality of frames, each frame of the target face model including a second plurality of facial keypoints or landmarks. Generally, there may be a one-to-one correspondence between the first plurality of facial keypoints of the source face model and the second plurality of facial keypoints of the target face model.

Then, for corresponding frames of the source face model and the target face model, respective distances may be determined between corresponding pairs of the first plurality of facial keypoints and the second plurality of facial keypoints. Based on the respective distances, the first plurality of facial keypoints and associated surfaces of the source face model may be transformed or warped to the second plurality of facial keypoints of the target face model. The transformation may comprise two-dimensional texture warping, two-dimensional affine transformations, or other similar two-dimensional transformations of positions of facial keypoints and associated surfaces.

In addition, the first plurality of facial keypoints and associated surfaces of the source face model may comprise a first plurality of facial triangles, and the second plurality of facial keypoints of the target face model may also comprise a second plurality of facial triangles. As a result of the two-dimensional transformation or warping of the positions of facial keypoints, the first plurality of facial triangles may also be transformed or warped to substantially match the shapes of the second plurality of facial triangles.

Furthermore, for individual frames of the target face model, a best or good matching mouth interior may be identified or determined from the plurality of frames of the source video. Then, the respective matching mouth interiors may be applied and blended with the individual frames of the target face model. In addition, various post-processing techniques may be applied to the surface textures of the plurality of target frames of the target face model to improve overall image quality.

In example embodiments, a target video having synthetic lip synchronization that matches a target audio track may be generated including the transformed or warped surfaces of the plurality of target frames of the target face model. Because the texture warping of the surfaces comprises two-dimensional transformations of keypoints and associated triangles, the surface textures of the original source video content may be substantially maintained as part of the generated synthetic lip synchronization, thereby improving the viewing experience for customers by generating a natural and believable synthetic lip synchronization. As further described herein, the target video may also include the applied and blended matching mouth interiors of the plurality of target frames of the target face model, which may further improve the viewing experience for customers by generating a natural and believable synthetic lip synchronization having faithful surface textures and matching mouth interiors of the original source video content.

FIG. 1 is a schematic diagram 100 of an example synthetic lip synchronization generation process, in accordance with implementations of the present disclosure.

As shown in FIG. 1, a source video 101, such as a movie, television show, or other types of video content, may be received. The source video 101 may include a plurality of frames of video content and a corresponding audio track in a first or source language. Based on the source video 101, a source face model 103 may be generated, e.g., using FaceMesh by Google, or various other types of facial keypoint estimation or generation techniques, algorithms, or models. The source face model 103 may also include a plurality of frames that correspond to the plurality of frames of the source video content.

The source face model 103 may include a plurality of facial keypoints, including fixed keypoints and/or movable keypoints, based on the plurality of frames of the source video content. Generally, the fixed keypoints may be associated with locations or points of the face model that may not move, e.g., a forehead, left and right temples, a nose tip, or other locations or points. In addition, the movable keypoints may be associated with locations or points of the face model that may move with speech, emotions, or gestures, e.g., lips, mouth, cheeks, chin, eyes, eyebrows, or other locations or points. Further, the plurality of facial keypoints may form or define a plurality of facial triangles, and various surface textures may be associated with the plurality of facial keypoints and the plurality of facial triangles. Surface textures may include color, shade, moles, scars, wrinkles, dimples, hair, skin artifacts, or various other surface features or textures.

As shown in FIG. 1, a target audio track 105, such as speech or sounds corresponding to the source video 101, may also be received. The target audio track 105 may include an audio track in a second or target language that may correspond to the plurality of frames of video content, in which the second or target language is different from the first or source language. Based on the target audio track 105, a target face model 107 may be generated, e.g., using FaceMesh by Google, or various other types of facial keypoint estimation or generation techniques, algorithms, or models. The target face model 107 may also include a plurality of frames that correspond to the plurality of frames of the source video content.

The target face model 107 may include a plurality of facial keypoints, including fixed keypoints and/or movable keypoints, based on the target audio track that corresponds to the plurality of frames of the source video content. Generally, the fixed keypoints may be associated with locations or points of the face model that may not move, e.g., a forehead, left and right temples, a nose tip, or other locations or points. In addition, the movable keypoints may be associated with locations or points of the face model that may move with speech, emotions, or gestures, e.g., lips, mouth, cheeks, chin, eyes, eyebrows, or other locations or points. Further, the plurality of facial keypoints may also form or define a plurality of facial triangles. Moreover, there may be a one-to-one correspondence between the plurality of facial keypoints of the source face model 103 and the plurality of facial keypoints of the target face model 107.

For corresponding frames of the target face model 107 and the source face model 103, because the speech, emotions, or gestures of the target face model 107 based on the target audio track 105 may differ from the speech, emotions, or gestures of the source face model 103 based on the source video 101, at least some of the plurality of facial keypoints of the target face model 107 may be at different locations or points as compared with the corresponding plurality of facial keypoints of the source face model 103. Thus, the respective distances between corresponding pairs of facial keypoints of the source face model 103 and the target face model 107 may be determined for corresponding frames of the source and target face models.

Then, for the corresponding pairs of facial keypoints, individual first keypoints of the source face model 103 and associated surfaces may be transformed or warped to individual second keypoints of the target face model 107 based on the respective distances using two-dimensional transformations. The two-dimensional transformations may comprise two-dimensional texture warping, two-dimensional affine transformations, or other types of two-dimensional surface or texture transformations. By transforming or warping the first plurality of keypoints and associated surfaces of the source face model 103 to locations or positions of the second plurality of keypoints of the target face model 107 for corresponding frames of the source and target face models, respective target frames 109 having transformed or warped surface textures may be generated. Further, the two-dimensional transformations may substantially maintain surface features or textures of portions of the source frames of the source face model 103 at corresponding portions of the target frames of the target face model 107. As described herein, various surface textures may include color, shade, moles, scars, wrinkles, dimples, hair, skin artifacts, or various other surface features or textures.

Further, for the plurality of target frames 109 of the target face model 107, a best or good matching mouth interior 111 may be selected or identified based on source frames of the source video 101. As further described herein, the best or good matching mouth interior may have a similar pose or orientation of the face or mouth in the source video 101 as a pose or orientation of the respective target frame. Then, the selected matching mouth interior 111 may be copied, applied, and blended with the respective target frame 109 to generate a complete or final target frame of a target video 113. Various post-processing may also be performed to finalize the surface textures and image quality of the target frames of the target video 113.

As a result, the target video 113 may include the plurality of target frames 109 with transformed or warped surface textures and respective matching mouth interiors 111 that match the speech, emotions, or gestures of the target audio track 105. Furthermore, the target video 113 may substantially maintain, preserve, or retain surface features or textures of corresponding portions of the source frames of the source video 101, thereby generating natural and believable synthetic lip synchronization based on the target audio track 105.

Figure 2:
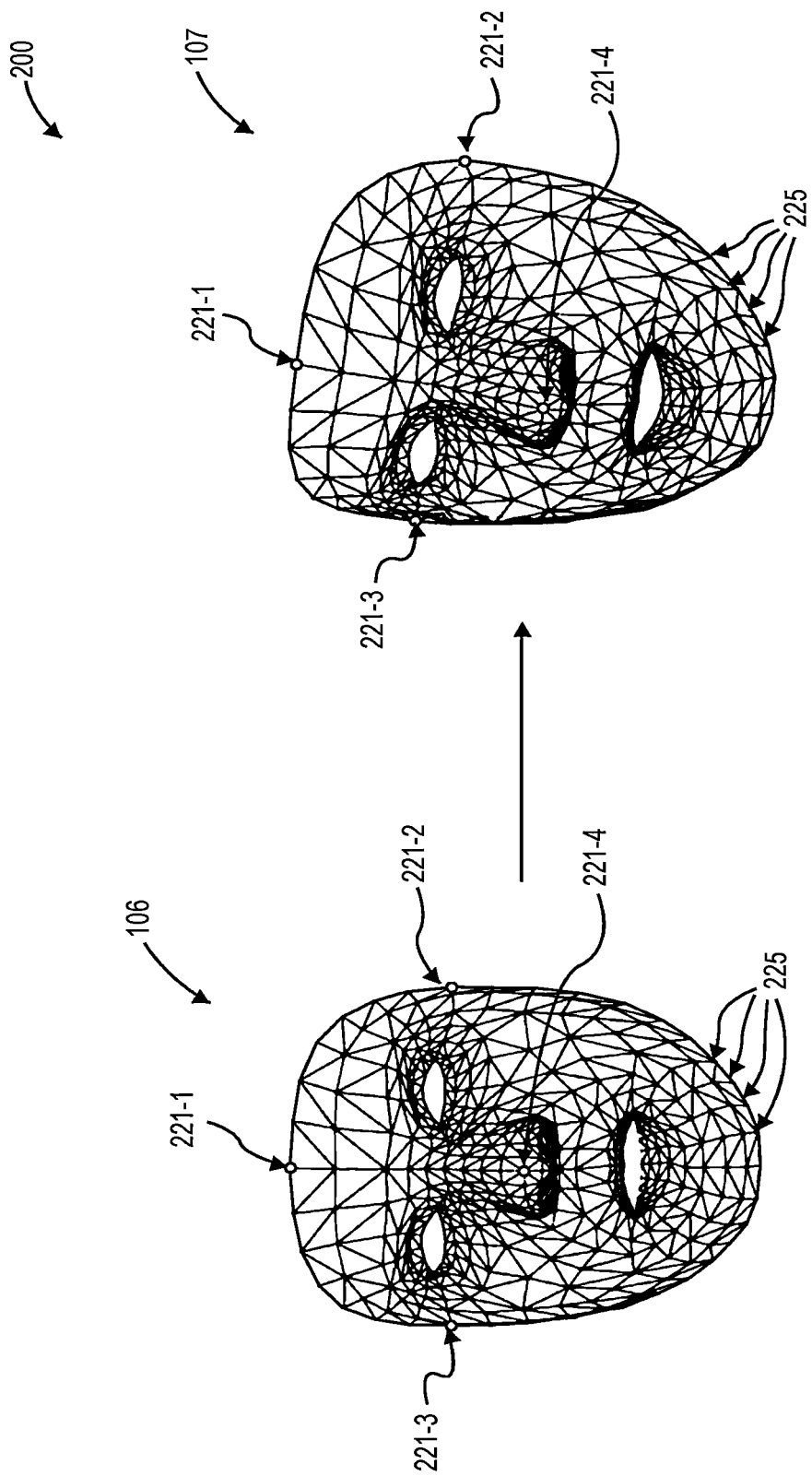
FIG. 2 is a schematic diagram of an example three-dimensional transformation of a face model to support a synthetic lip synchronization generation process, in accordance with implementations of the present disclosure.

FIG. 2 is a schematic diagram 200 of an example three-dimensional transformation of a face model to support a synthetic lip synchronization generation process, in accordance with implementations of the present disclosure.

As shown in FIG. 2, an initial target face model 106 may be generated including a plurality of facial keypoints, including fixed keypoints 221 and/or movable keypoints 225, based on the target audio track that corresponds to the plurality of frames of the source video content. Various types of facial keypoint estimation or generation techniques, algorithms, or models, such as FaceMesh by Google or others, may generate the initial target face model 106 based on a target audio track.

In example embodiments, the fixed keypoints 221 may comprise keypoints associated with a forehead, temples, and/or a nose of a face of an actor, person, or character, e.g., fixed keypoints 221-1, 221-2, 221-3, 221-4 that may generally remain fixed in position relative to each other. The movable keypoints 225 may comprise keypoints associated with lips, mouth, cheeks, chin, eyes, eyebrows, or other locations or points that may generally move with speech, emotions, or gestures relative to each other.

In some examples, facial keypoint estimation or generation techniques, algorithms, or models may generate an initial target face model 106 in a full frontal view, as shown in the left side of FIG. 2, or in other reference or base positions or orientations. For such examples, a pose of the initial target face model 106 may need to be moved, rotated, or reoriented to match a pose of the source face model 103 based on the source video 101. In order to match the pose, locations of the fixed keypoints 221 may be moved, rotated, and/or reoriented to match the locations of corresponding fixed keypoints of the source face model 103, e.g., corresponding fixed keypoints at the forehead, temples, and/or nose of a face of an actor, person, or character.

The movement, rotation, or reorientation of the plurality of keypoints of the initial target face model 106 to the target face model 107 may be performed by various three-dimensional transformation or reorientation techniques, algorithms, or techniques, including three-dimensional affine transformations. As one example, three-dimensional affine transformations are described by Tymchyshyn, V. B. et al., "Workbook on mapping simplexes affinely," Bogolyubov Institute for Theoretical Physics, National Academy of Sciences, Ukraine, Aug. 10, 2019. Generally, at least four fixed keypoints may be needed in order to perform the three-dimensional transformations to the target face model 107 described herein, and the four fixed keypoints may be non-coplanar with each other.

Upon matching the locations of the fixed keypoints 221 of the initial target face model 106 to corresponding locations of fixed keypoints of the source face model 103, a target face model 107 having a same or correct pose as the source face model 103 may be generated, as shown in the right side of FIG. 2. Concurrently with such movement, rotation, and/or reorientation of the fixed keypoints 221 of the initial target face model 106, the movable keypoints 225 may also be correspondingly moved, rotated, or reoriented to new locations that maintain relative positions and/or orientations of the plurality of facial keypoints with respect to each other in three-dimensional space, as shown in the right side of FIG. 2.

Figure 3:
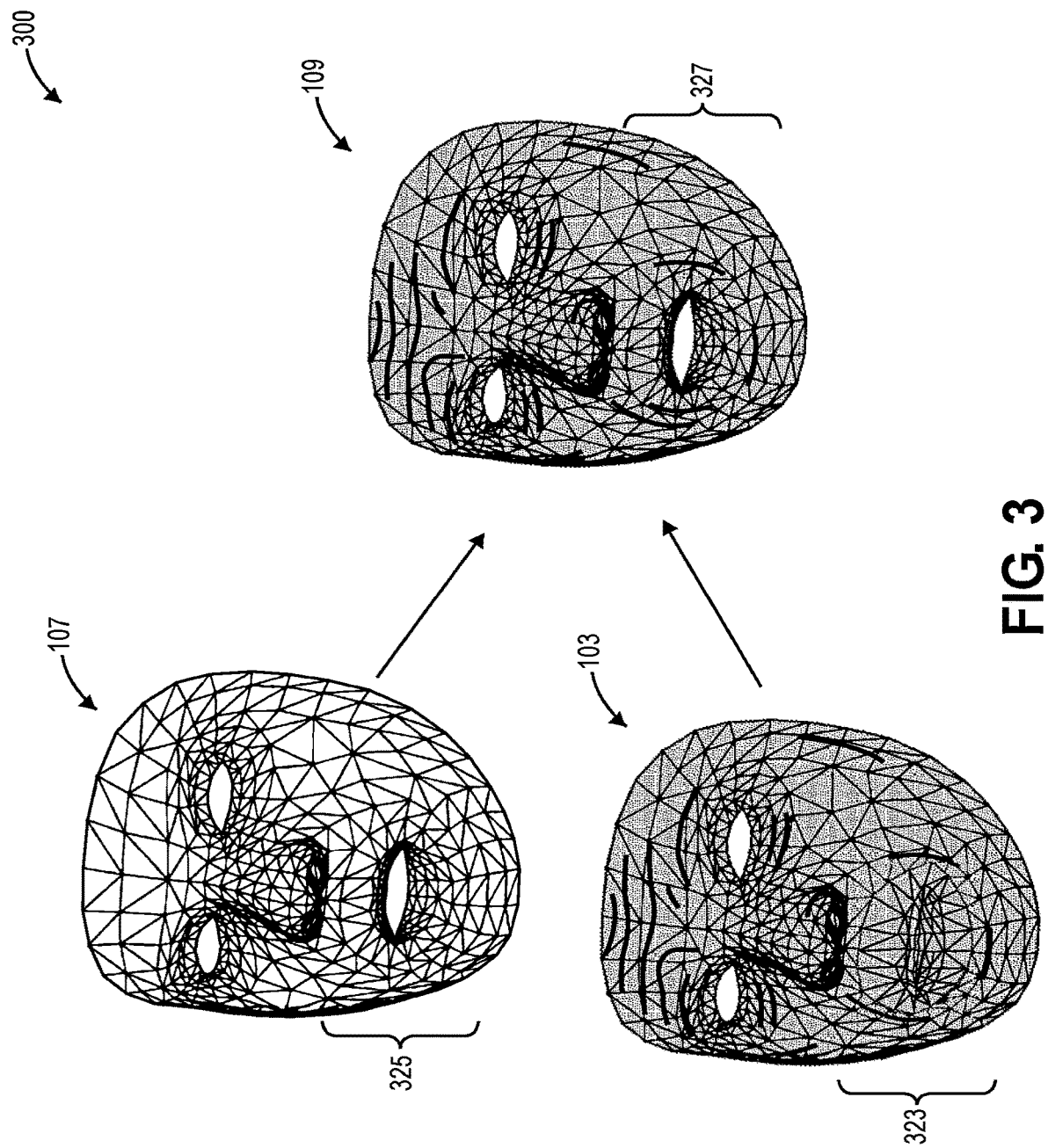
FIG. 3 is a schematic diagram of an example two-dimensional transformation of portions of a face model to generate synthetic lip synchronization having faithful textures, in accordance with implementations of the present disclosure.

FIG. 3 is a schematic diagram 300 of an example two-dimensional transformation of portions of a face model to generate synthetic lip synchronization having faithful textures, in accordance with implementations of the present disclosure.

As shown in FIG. 3, a source face model 103 may be generated including a plurality of facial keypoints, including fixed keypoints and/or movable keypoints 323, based on a source video having a plurality of frames of source video content and corresponding source audio track. Various types of facial keypoint estimation or generation techniques, algorithms, or models, such as FaceMesh by Google or others, may generate the source face model 103 based on a source video. The source face model 103 may comprise a plurality of frames that correspond to the plurality of frames of the source video content.

For example, the facial keypoint estimation or generation algorithms may comprise keypoint estimator models that receive the source video with an actor, person, or character speaking the source audio track, and that output facial keypoints based on image processing of the mouth and facial movements of the person speaking the source audio track. In other examples, the facial keypoint estimation or generation algorithms may comprise neural networks or other machine learning models or algorithms that receive the source video and corresponding source audio track, and that output facial keypoints based on the source video and corresponding source audio track.

In example embodiments, the plurality of keypoints may include fixed keypoints, e.g., associated with a forehead, temples, and/or a nose of a face of an actor, person, or character that may generally remain fixed in position, and movable keypoints 323, e.g., associated with lips, mouth, cheeks, chin, eyes, eyebrows, or other locations or points that may generally move with speech, emotions, or gestures. In addition, the plurality of keypoints may form or define a plurality of triangles among the plurality of keypoints, and surface textures or features of portions of a face or mouth of an actor, person, or character may be represented within the plurality of triangles and associated with the plurality of keypoints.

In the example shown in FIG. 3, at least some of the movable keypoints 323 around a mouth of the actor, person, or character may be positioned at particular locations based on speech, emotions, or gestures associated with a particular frame of the source face model 103. Further, various surfaces may be associated with the movable keypoints 323 around the mouth and/or may be represented within a plurality of triangles associated with the movable keypoints 323.

As further shown in FIG. 3, a target face model 107 may be generated including a plurality of facial keypoints, including fixed keypoints and/or movable keypoints 325, based on a target audio track that corresponds to the plurality of frames of source video content. Various types of facial keypoint estimation or generation techniques, algorithms, or models, such as FaceMesh by Google or others, may generate the target face model 107 based on a target audio track. The target face model 107 may comprise a plurality of frames that correspond to the plurality of frames of the source video content and associated plurality of frames of the source face model.

For example, the facial keypoint estimation or generation algorithms may comprise neural networks or other machine learning models or algorithms that receive the target audio track, and that output facial keypoints based on the target audio track. In some examples, the facial keypoint estimation or generation algorithms may receive the source video and the target audio track, may process phonemes of the target audio track in order to estimate various facial keypoints based on the phonemes, and may output the target face model 107 based on the face represented in the source video and the estimated facial keypoints based on the processed phonemes of the target audio track. In other examples, the facial keypoint estimation or generation algorithms may comprise keypoint estimator models that receive video data with an actor, person, or character speaking the target audio track, and output facial keypoints based on image processing of the mouth and facial movements of the person speaking the target audio track.

In example embodiments, the plurality of keypoints may include fixed keypoints, e.g., associated with a forehead, temples, and/or a nose of a face of an actor, person, or character that may generally remain fixed in position, and movable keypoints 325, e.g., associated with lips, mouth, cheeks, chin, eyes, eyebrows, or other locations or points that may generally move with speech, emotions, or gestures. In addition, the plurality of keypoints may form or define a plurality of triangles among the plurality of keypoints, and surface textures or features of portions of a face or mouth of an actor, person, or character may be represented within the plurality of triangles and associated with the plurality of keypoints.

As described herein at least with respect to FIG. 2, a pose of the target face model 107 may also be moved, rotated, or reoriented to match a pose of the source face model 103, e.g., by determining and matching positions of various fixed keypoints among the plurality of keypoints of the source and target face models, and also reorienting various movable keypoints in corresponding manner.

In the example shown in FIG. 3, at least some of the movable keypoints 325 around a mouth of the actor, person, or character may be positioned at particular locations based on speech, emotions, or gestures associated with a particular frame of the target face model 107. Further, various surfaces may be associated with the movable keypoints 325 around the mouth and/or may be represented within a plurality of triangles associated with the movable keypoints 325.

As can be seen in the example of FIG. 3, at least some of the movable keypoints 323 of the source face model 103 may be at different locations than at least some of the movable keypoints 325 of the target face model 107 due to differences between the source audio track and the target audio track. Thus, for respective frames of the source face model 103 and target face model 107, distances between corresponding pairs of the movable keypoints 323, 325 may be determined.

Then, for respective frames of the source face model 103 and target face model 107, corresponding pairs of movable keypoints and associated surfaces of the source face model 103 may be transformed or warped from locations of the movable keypoints 323 of the source face model 103 to locations of the movable keypoints 325 of the target face model 107. In similar manner, the shapes or positions of the triangles defined or formed by the movable keypoints 323 of the source face model 103 may be reshaped or modified to substantially match the shapes or positions of the triangles defined or formed by the movable keypoints 325 of the target face model 107.

As a result, respective frames 109 having transformed or warped movable keypoints 327 and associated surfaces may be generated. The frames 109 may include surface features or textures that correspond to video data of the face or mouth in the source video, and may also include transformed or warped face or mouth keypoints 327 that correspond to phonemes of the target audio track. Thus, the plurality of frames 109 may include transformed or warped keypoints 327 and associated surfaces that match the target audio track.

In example embodiments, the transformation or warping of keypoints and associated surfaces from a source face model 103 to a target face model 107 may be performed via two-dimensional transformations. For example, the transformations may comprise two-dimensional texture warping of the keypoints and associated surfaces, and/or the transformations may comprise two-dimensional affine transformations of the keypoints and associated surfaces, such as simplex affine map (SAM) transformations. As one example, two-dimensional affine transformations are described by Tymchyshyn, V. B. et al., "Workbook on mapping simplexes affinely," Bogolyubov Institute for Theoretical Physics, National Academy of Sciences, Ukraine, Aug. 10, 2019.

Furthermore, because the transformation or warping of keypoints and associated surfaces from a source face model 103 to a target face model 107 may be performed only in two-dimensional space, without any additional or intermediate transformations in three-dimensional space, the surface features or textures associated with the plurality of keypoints and associated surfaces may be substantially maintained or preserved. In addition, only a single two-dimensional transformation may be performed for the keypoints and associated surfaces, thereby further preserving the associated surface features or textures. As a result, for high-definition or other high quality source video content, the two-dimensional transformation or warping described herein may maintain, preserve, or retain photorealistic image quality of surface features or textures while also generating natural and believable synthetic lip synchronization based on a target audio track.

In contrast, transformations in three-dimensional space may blur or reduce image quality or resolution, remove skin textures or artifacts, and/or add other extraneous surface features or artifacts. Moreover, transformations in three-dimensional space may also be more computationally expensive than the two-dimensional texture warping of keypoints and surfaces described herein.

Figure 4:
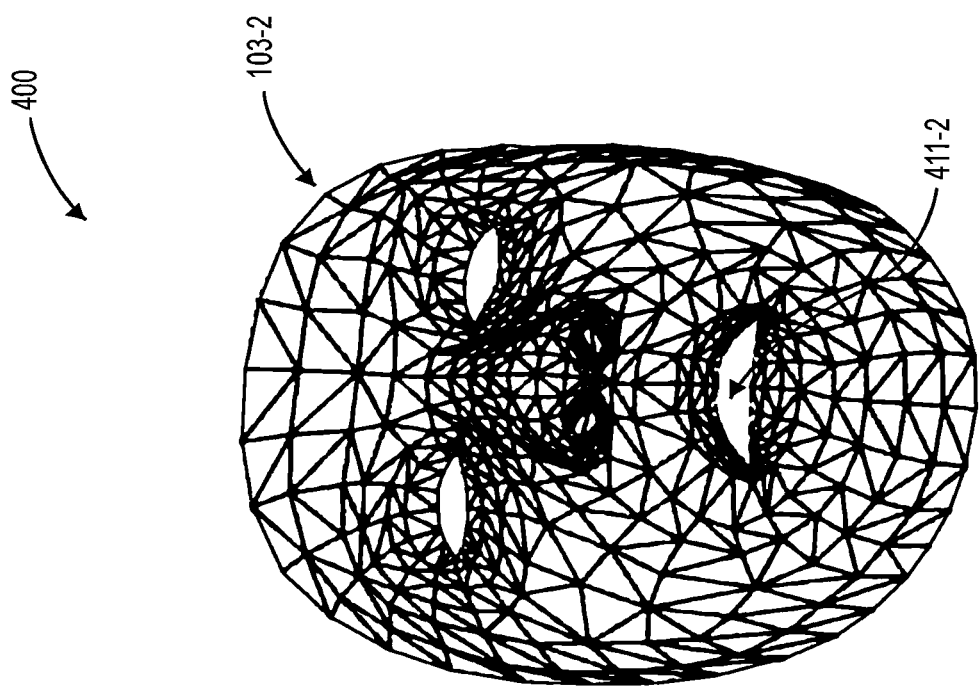
FIG. 4 is a schematic diagram of example mouth interior portions of a face model to support a synthetic lip synchronization generation process, in accordance with implementations of the present disclosure.
Figure 4:
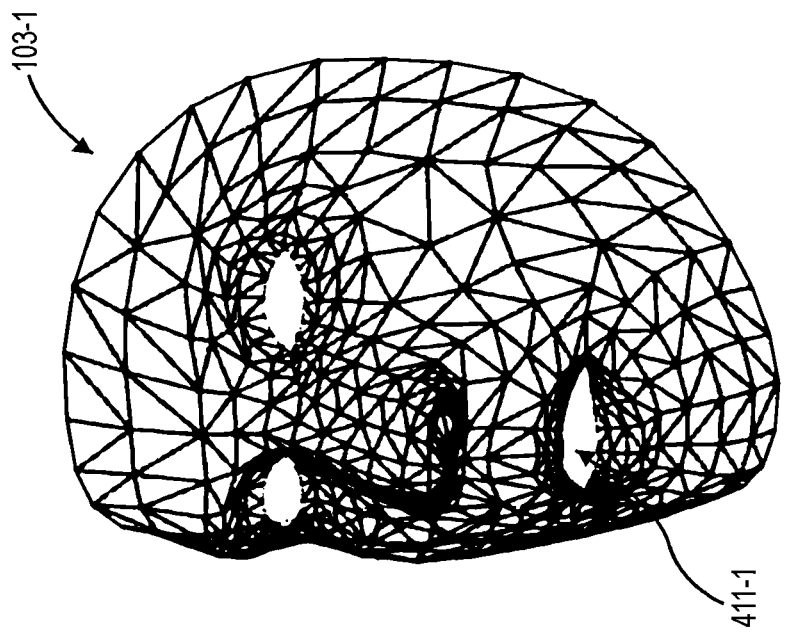

FIG. 4 is a schematic diagram 400 of example mouth interior portions of a face model to support a synthetic lip synchronization generation process, in accordance with implementations of the present disclosure.

As shown in FIG. 4, various frames of a source face model based on a source video may include different positions or orientations of mouth interior portions 411. For example, a first example source frame 103-1 shown in the left side of FIG. 4 may include a first example mouth interior portion 411-1, and a second example source frame 103-2 shown in the right side of FIG. 4 may include a second example mouth interior portion 411-2. Various other example source frames of a source face model may include other example positions or orientations of mouth interior portions 411. Various mouth interior portions 411 may include surface features or textures associated with teeth, gums, tongues, inner portions of cheeks, or other mouth interior surface features or textures.

In example embodiments, in order to select a mouth interior portion to be applied to a target frame of a target face model, a source frame having a pose or orientation of a face or mouth that is substantially similar to a pose or orientation of a face or mouth of the target frame may be identified or selected. For example, for the target frame 109 shown in FIG. 3, a mouth interior portion 411-1 of the face or mouth of the example source frame 103-1 may have a similar pose or orientation as that of the face or mouth of the target frame 109, whereas a mouth interior portion 411-2 of the face or mouth of the example source frame 103-2 may not have a similar pose or orientation as that of the face or mouth of the target frame 109.

In some example embodiments, various changes or modifications to a pose or orientation of the face or mouth of a source frame may be allowed and still provide a mouth interior portion that can be applied to a target frame. For example, rotation of the face or mouth of a source frame about an axis that is perpendicular to a two-dimensional plane of the source frame may not alter or change the mouth interior portion, e.g., which may be labeled a roll rotation of the source frame. In addition, translational movement of the face or mouth of a source frame within a two-dimensional plane of the source frame also may not alter or change the mouth interior portion, e.g., which may be labeled a movement along an X-axis and/or a Y-axis. Further, scaling of the face or mouth of a source frame within a two-dimensional plane of the source frame also may not alter or change the mouth interior portion, e.g., which may be labeled zooming in or out of the source frame.

In additional example embodiments, other changes or modifications to a pose or orientation of the face or mouth of a source frame may not be allowed and may not provide a mouth interior portion that can be applied to a target frame. For example, rotation of the face or mouth of a source frame about a horizontal axis that extends along and across a two-dimensional plane of the source frame may alter or change the mouth interior portion, e.g., which may be labeled a pitch rotation of the source frame. In addition, rotation of the face or mouth of a source frame about a vertical axis that extends along and across a two-dimensional plane of the source frame may also alter or change the mouth interior portion, e.g., which may be labeled a yaw rotation of the source frame.

Furthermore, a source library of mouth interior portions may be created or generated based on different poses or orientations of a face or mouth of an actor, person, or character that match various speech, emotions, or gestures, e.g., a source library of visemes. By searching, sorting, or filtering through the source library of visemes, a best or good matching mouth interior portion of a source frame may be selected for individual target frames of a target video. Then, the best or good matching mouth interior portion may be extracted or copied from the source frame and applied or pasted to the target frame.

Figure 5:
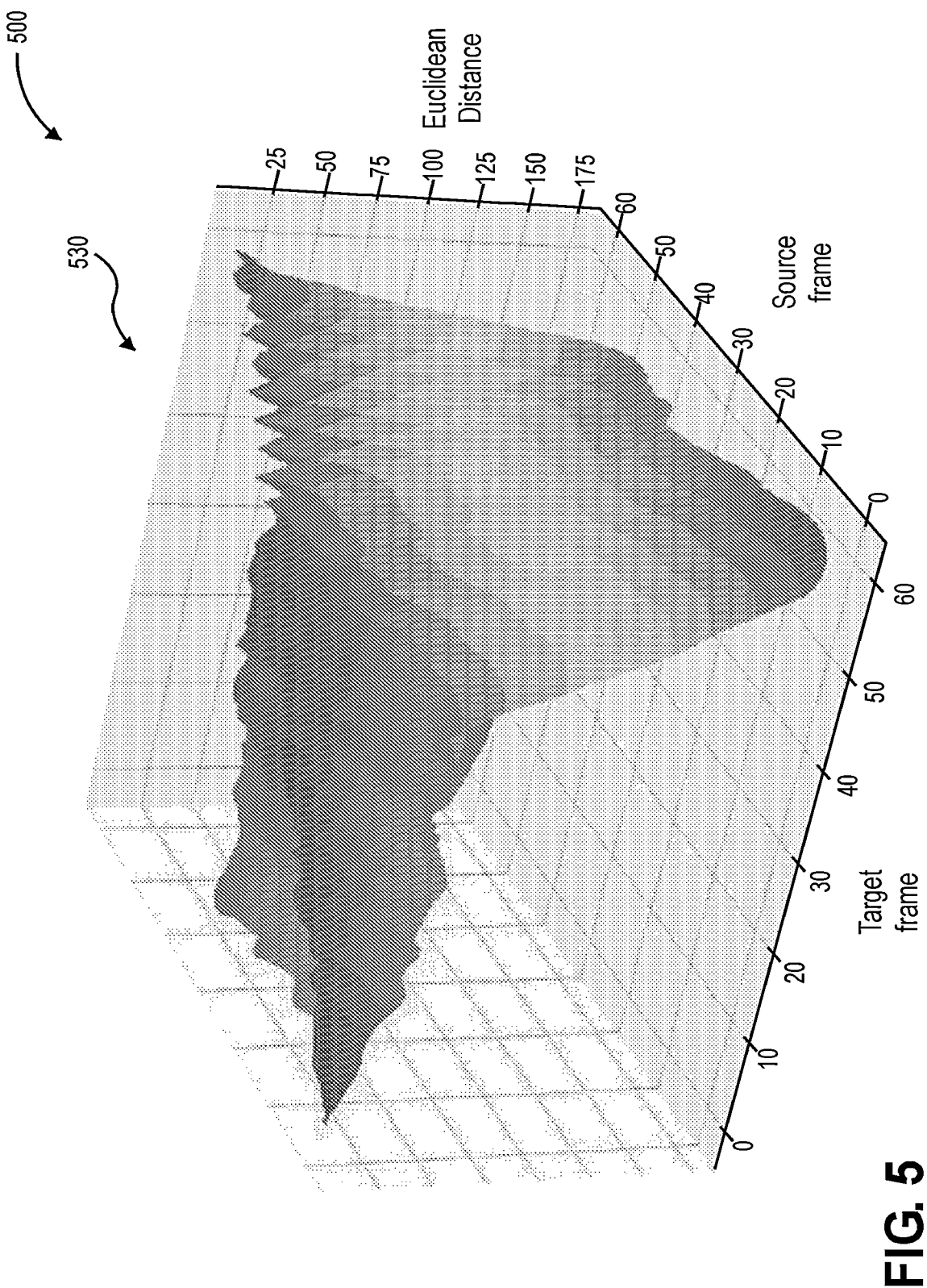
FIG. 5 is a schematic graphical diagram of an example algorithm for selecting mouth interior portions of a face model to support a synthetic lip synchronization generation process, in accordance with implementations of the present disclosure.

FIG. 5 is a schematic graphical diagram 500 of an example algorithm for selecting mouth interior portions of a face model to support a synthetic lip synchronization generation process, in accordance with implementations of the present disclosure.

As shown in FIG. 5, an example algorithm for selecting mouth interior portions from source frames of a source video that match target frames of a target video is illustrated as a graph or model 530 showing Euclidean distance between facial keypoints of a source face model and facial keypoints of a target face model. The target frames are graphically illustrated along a first horizontal axis, the source frames are graphically illustrated along a second horizontal axis that is orthogonal to the first horizontal axis, and the Euclidean distance between keypoints of the source frames and target frames is graphically illustrated along a vertical axis that is orthogonal to each of the first and second horizontal axes.

In example embodiments, a lower value of Euclidean distance between keypoints of a source frame and a target frame, e.g., one or more peaks of the graph, indicates a potentially best or good match between a pose or orientation of a face of a source frame and a pose or orientation of a face of a target frame, and thereby a potentially best or good matching mouth interior portion represented in the source frame that may be copied and applied to the target frame. Conversely, a higher value of Euclidean distance between keypoints of a source frame and a target frame, e.g., one or more valleys of the graph, indicates a potentially worst or poor match between a pose or orientation of a face of a source frame and a pose or orientation of a face of a target frame, and thereby a potentially worst or poor matching mouth interior portion represented in the source frame that may be copied and applied to the target frame.

In additional example embodiments, using the example algorithm that is graphically illustrated in FIG. 5, a best matching mouth interior portion may be selected for a target frame individually and/or independently from other target frames, e.g., by selecting a matching mouth interior associated with one of the peaks of the graph. However, by selecting best matching mouth interior portions in this individual or independent manner, jumping or jittery mouth interior portions may be generated as a consequence, e.g., because of relatively slight or minor variations in pose or orientation of mouth interior portions in non-consecutive source frames that may be applied to consecutive target frames. As shown graphically in FIG. 5, such a selection of individual or independent best matching mouth interior portions may comprise source frames that are disconnected or separate peaks or other portions of the graph.

In further example embodiments, rather than selecting best matching mouth interior portions for a target frame individually and/or independently from other target frames, good matching mouth interior portions may be selected for a plurality of consecutive or adjacent target frames from source frames that may also be substantially consecutive or adjacent source frames of a source video. In this manner, good matching mouth interior portions may be selected for a group or sequence of consecutive or adjacent target frames from a similar group or sequence of consecutive or adjacent source frames, such that jumping or jittery mouth interior portions may be avoided or reduced. As shown graphically in FIG. 5, such a selection of a group or sequence of good matching mouth interior portions may comprise source frames that are clustered or positioned together around one or more peaks of the graph, and/or that comprise a sequence, group, or order of source frames, in which each source frame of the sequence has a minimal or small distance from adjacent source frames.

Thus, the example algorithm for selecting mouth interior portions from source frames of a source video that match target frames of a target video may attempt to select mouth interior portions for consecutive or adjacent groups or sequences of target frames from similarly consecutive or adjacent groups or sequences of source frames, thereby reducing jumping, jittery, or otherwise visually distracting artifacts or effects associated with applied mouth interior portions.

Figure 6:
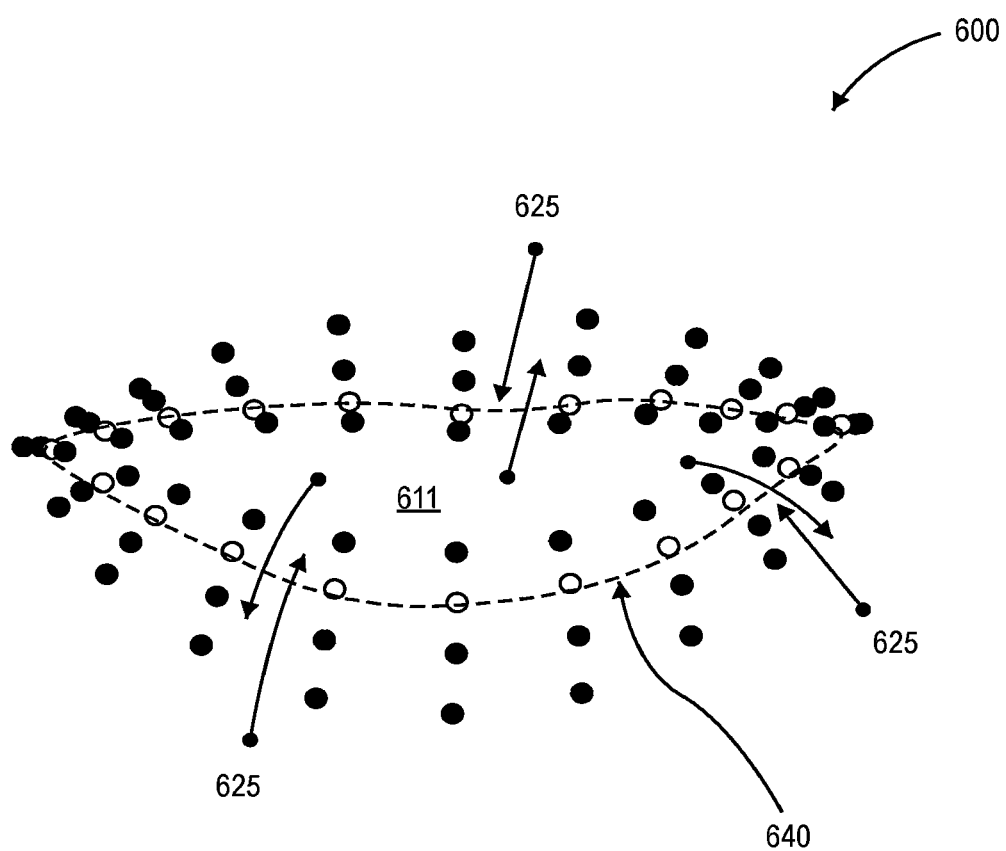
FIG. 6 is a schematic diagram of an example algorithm for blending portions of a face model with mouth interior portions of a face model to support a synthetic lip synchronization generation process, in accordance with implementations of the present disclosure.

FIG. 6 is a schematic diagram 600 of an example algorithm for blending portions of a face model with mouth interior portions of a face model to support a synthetic lip synchronization generation process, in accordance with implementations of the present disclosure.

Responsive to selecting, copying, and pasting mouth interior portions from source frames of a source video to target frames of a target video, one or more stitching lines, curves, or other visual artifacts may be visible or noticeable along an interface between the transformed or warped facial keypoints and associated surfaces and the applied mouth interior portions. In order to smooth or blend the interface between the warped keypoints and surfaces and the applied mouth interior portions, various blending techniques or algorithms may be used, such as Gaussian blur techniques or other types of blending algorithms. The application of blending algorithms to the interface may provide a smooth transition between an inside of a mouth and an outside of a mouth by hiding or blurring the stitching lines, curves, or other visual artifacts.

In the example illustrated in FIG. 6, a stitching line 640 may be visible or noticeable along an interface between the transformed or warped facial keypoints 625 and associated surfaces and an applied mouth interior portion 611. In order to smooth or blend the interface or stitching line 640 between the warped keypoints 625 and surfaces and the applied mouth interior portion 611, blending techniques or algorithms, such as Gaussian blur techniques, may be applied. In some examples, a blending or blurring technique or algorithm may be applied from an interior of the mouth, e.g., proximate mouth interior portion 611, toward an exterior of the mouth, e.g., proximate facial keypoints 625 around the mouth, as illustrated by arrows starting in the interior and extending toward an exterior of the mouth. Alternatively or in addition, a blending or blurring technique or algorithm may be applied from an exterior of the mouth, e.g., proximate facial keypoints 625 around the mouth, toward an interior of the mouth, e.g., proximate mouth interior portion 611, as illustrated by arrows starting at the exterior and extending toward an interior of the mouth. The application of such blending or blurring techniques or algorithms to the interface or stitching line 640 may provide a smooth transition between an inside of a mouth and an outside of a mouth by hiding or blurring the stitching lines, curves, or other visual artifacts.

In further examples, various blurring or blending techniques may adjust the transparency of portions of the target frames. For example, for blending or blurring starting from an interior of the mouth, e.g., proximate mouth interior portion 611, toward an exterior of the mouth, e.g., proximate facial keypoints 625 around the mouth, the transparency of the mouth interior portion 611 may increase with increasing distance from the interior toward the exterior of the mouth. Similarly, for blending or blurring starting from an exterior of the mouth, e.g., proximate facial keypoints 625 around the mouth, toward an interior of the mouth, e.g., proximate mouth interior portion 611, the transparency of the facial keypoints 625 and associated surfaces may increase with increasing distance from the exterior toward the interior of the mouth.

In additional example embodiments, various post-processing techniques or algorithms may be applied to the target frames of the target video to remove visual artifacts, improve pixel alignment, and/or improve image quality. For example, various types of visual artifacts may need to be removed from the target frames, such as dimples, wrinkles, or other surface features or textures. In some scenarios, upon texture warping facial keypoints and associated surfaces based on the source and target face models, various artifacts such as dimples, wrinkles, or other surface features or textures may need to be removed as no longer appropriate, e.g., if the warped facial keypoints and associated surfaces that match the target audio track should not generally include such artifacts. In addition, various post-processing techniques or algorithms may better align pixels of the target frames relative to each other to improve overall image quality of the target video. In some scenarios, the post-processing may better align a mouth interior portion with warped facial keypoints and associated surfaces.

In some examples, the post-processing techniques and algorithms may include fine-tuning using generative adversarial networks (GANs) to remove visual artifacts, improve pixel alignment, and/or improve overall image quality. Various other types of post-processing techniques or algorithms may also be applied to various target frames of a target video to remove visual artifacts, improve pixel alignment, and/or improve overall image quality.

Figure 7:
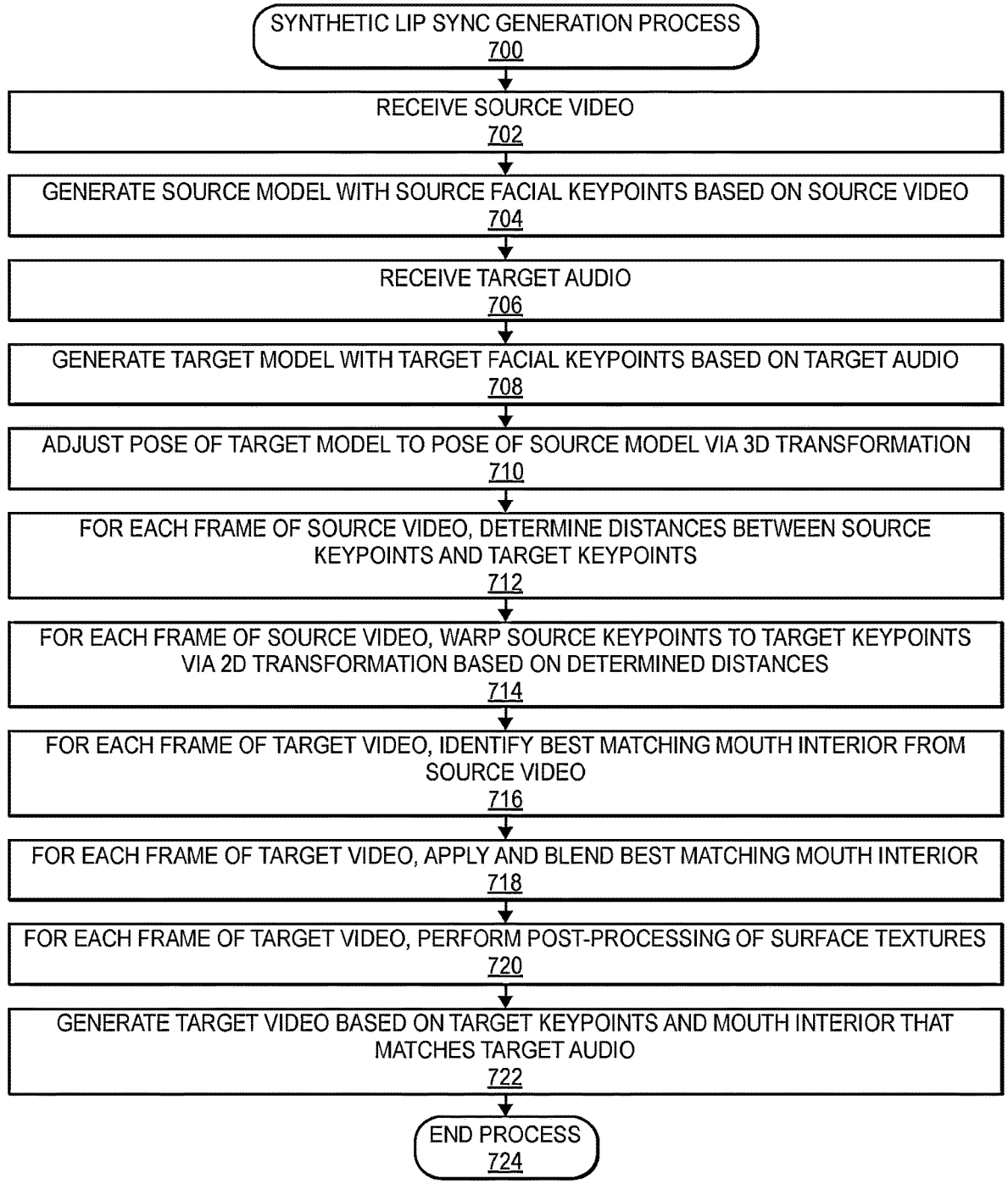
FIG. 7 is a flow diagram illustrating an example synthetic lip synchronization generation process, in accordance with implementations of the present disclosure.

FIG. 7 is a flow diagram illustrating an example synthetic lip synchronization generation process 700, in accordance with implementations of the present disclosure.

The process 700 may begin by receiving source video, as at 702. For example, the source video may include a plurality of source frames of video content and a corresponding source audio track in a first or original language. Further, a control system may receive the source video.

The process 700 may continue by generating a source model with source facial keypoints based on the source video, as at 704. For example, a source face model having source facial keypoints may be generated using FaceMesh by Google, or various other types of facial keypoint estimation or generation techniques, algorithms, or models. The source face model may also include a plurality of frames that correspond to the plurality of source frames of the source video content. The source facial keypoints may include fixed keypoints and movable keypoints, and the facial keypoints may form or define a plurality of facial triangles. Various surface textures may be associated with the plurality of facial keypoints and the plurality of facial triangles, such as color, shade, moles, scars, wrinkles, dimples, hair, skin artifacts, or various other surface features or textures. Further, a control system may generate the source face model with source facial keypoints based on the source video.

The process 700 may proceed by receiving target audio, as at 706. For example, the target audio track may include an audio track in a second or target language that may also correspond to the plurality of frames of source video content. Further, a control system may receive the target audio.

The process 700 may continue to generate a target model with target facial keypoints based on the target audio, as at 708. For example, a target face model having target facial keypoints may be generated using FaceMesh by Google, or various other types of facial keypoint estimation or generation techniques, algorithms, or models. The target face model may also include a plurality of frames that correspond to the plurality of source frames of the source video content. The target facial keypoints may include fixed keypoints and movable keypoints, and the facial keypoints may form or define a plurality of facial triangles. Further, a control system may generate the target face model with target facial keypoints based on the target audio track.

The process 700 may proceed to adjust a pose of the target model to a pose of the source model via three-dimensional transformation, as at 710. For example, fixed keypoints of the target face model may be moved, rotated, or reoriented to align with corresponding fixed keypoints of the source face model in three-dimensional space, e.g., using three-dimensional affine transformations or other three-dimensional reorientation or alignment techniques or methods. In addition, remaining facial keypoints of the target face model, including movable keypoints, may be moved, rotated, or reoriented in three-dimensional space based on the alignment of the fixed keypoints of the target face model with the fixed keypoints of the source face model, in order to maintain their relative positions and orientations within the target face model. Further, a control system may adjust a pose of the target face model to a pose of the source face model.

The process 700 may then continue with, for each frame of the source video, determining distances between source keypoints and target keypoints, as at 712. For example, corresponding pairs of movable keypoints of the source face model and movable keypoints of the target face model may be at different locations. Respective distances for corresponding pairs of the movable keypoints of the source and target face models may be determined. Further, a control system may determine respective distances between source keypoints and target keypoints.

The process 700 may then proceed with, for each frame of the source video, warping source keypoints to target keypoints via two-dimensional transformation based on the determined distances, as at 714. For example, for corresponding pairs of movable keypoints of the source and target face models, the movable keypoints and associated surfaces of the source face model may be transformed or warped to locations or positions of the movable keypoints of the target face model, e.g., using two-dimensional affine transformations or other two-dimensional texture warping, translation, or alignment techniques or methods. In addition, the movable keypoints of the source face model may define or form a plurality of triangles having associated surfaces, and the plurality of triangles of the source face model may be reshaped or reformed to substantially match the shapes of a corresponding plurality of triangles formed or defined by the movable keypoints of the target face model. Moreover, the two-dimensional transformations may substantially maintain surface features or textures of portions of the source frames of the source face model at corresponding portions of the target frames of the target face model. Further, a control system may warp source keypoints to target keypoints via two-dimensional transformation based on the determined distances.

The process 700 may continue by, for each frame of target video, identifying a best matching mouth interior from the source video, as at 716. For example, a best or good matching mouth interior may be selected or identified based on source frames of the source video. The best or good matching mouth interior may have a similar pose or orientation of the face or mouth in the source video as a pose or orientation of the respective target frame. Further, a control system may identify a best or good matching mouth interior from source frames of the source video.

The process 700 may proceed by, for each frame of target video, applying and blending the best matching mouth interior, as at 718. For example, the best or good matching mouth interiors may be copied, pasted, and/or applied to the target frames of the target video. In addition, various blending or blurring techniques may be applied to the target frames to smooth or blend interfaces between the mouth interior portions and the warped keypoints and associated surfaces. Further, a control system may apply and blend the best or good matching mouth interiors to target frames of the target video.

The process 700 may continue to, for each frame of the target video, perform post-processing of surface textures, as at 720. For example, various post-processing techniques may be applied to target frames of the target video to improve pixel alignment, remove visual artifacts, and/or improve overall image quality. Further, a control system may perform post-processing of surface textures and/or image quality.

The process 700 may then proceed to generate target video based on the target keypoints and mouth interiors that matches the target audio, as at 722. For example, the target video that matches the target audio track may be generated by compiling and combining the plurality of target frames that have been processed as described herein. The plurality of target frames may have two-dimensionally warped facial keypoints and associated surfaces to align with the target audio track, and the plurality of target frames may also have applied and blended mouth interior portions from source frames of the source video that also align with the target audio track. As a result, the target video may comprise natural and believable synthetic lip synchronization that matches the target audio track and also substantially maintains or preserves surface textures or features from source frames of the original source video. Further, a control system may generate the target video that matches the target audio track.

The process 700 may then end, as at 724.

In example embodiments, the synthetic lip synchronization generation processes described herein may be performed offline or for recorded movies, shows, or other source video content. Based on recorded target audio tracks, the recorded or offline source video content may be processed to generate synthetic lip synchronization, and various target videos that match respective target audio tracks may be generated and stored for viewing by customers.

In other example embodiments, the synthetic lip synchronization generation processes described herein may be performed online or in near real-time with broadcast or streaming movies, shows, or other source video content. In addition, the target audio tracks may also be generated or received online or in near real-time with the source video content. Using the near real-time target audio tracks, the broadcast or streaming source video content may be processed to generate synthetic lip synchronization in near real-time, and various target videos that match respective target audio tracks may be generated for viewing in near real-time by customers. In order to process the source video content and target audio tracks as described herein, the target videos may be presented with a short time delay, e.g., approximately a few seconds or more, such that the target videos having synthetic lip synchronization with faithful textures may be presented in near real-time with the source video content.

Figure 8:
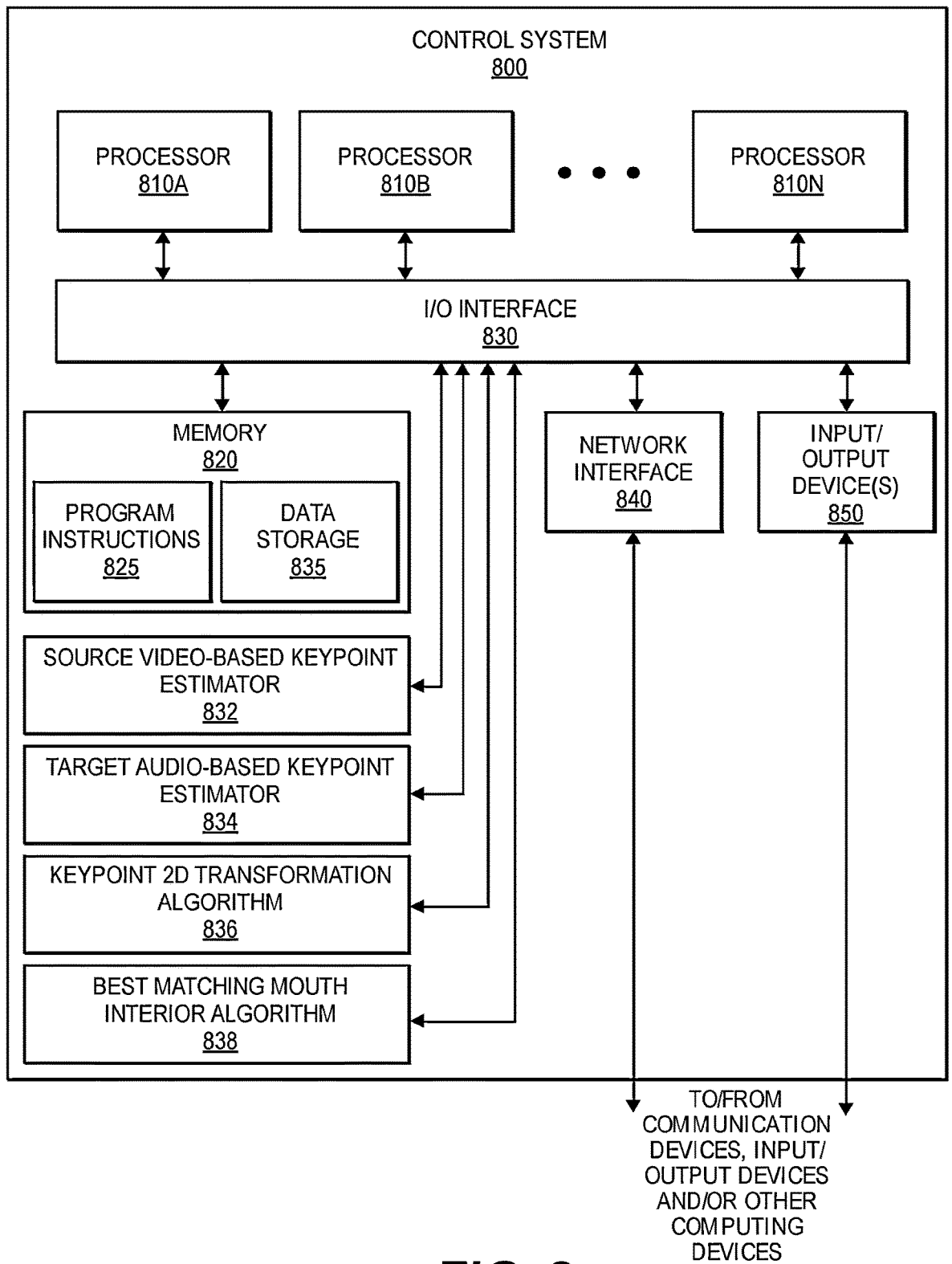
FIG. 8 is a block diagram illustrating various components of an example control system, in accordance with implementations of the present disclosure.

FIG. 8 is a block diagram illustrating various components of an example control system, in accordance with implementations of the present disclosure.

Various operations of a control system or controller, such as those described herein, may be executed on one or more computer systems, and/or interacting with various other computers, systems, or devices, according to various implementations. For example, the control system or controller discussed above may function and operate on one or more computer systems. One such control system is illustrated by the block diagram in FIG. 8. In the illustrated implementation, a control system 800 includes one or more processors 810A, 810B through 810N, coupled to a non-transitory computer-readable storage medium 820 via an input/output (I/O) interface 830. The control system 800 further includes a network interface 840 coupled to the I/O interface 830, and one or more input/output devices 850. In some implementations, it is contemplated that a described implementation may be implemented using a single instance of the control system 800 while, in other implementations, multiple such systems or multiple nodes making up the control system 800 may be configured to host different portions or instances of the described implementations. For example, in one implementation, some data sources or services (e.g., related to portions of synthetic lip synchronization generation systems, operations, or processes, etc.) may be implemented via one or more nodes of the control system 800 that are distinct from those nodes implementing other data sources or services (e.g., related to other portions of synthetic lip synchronization generation systems, operations, or processes, etc.).

In various implementations, the control system 800 may be a uniprocessor system including one processor 810A, or a multiprocessor system including several processors 810A-810N (e.g., two, four, eight, or another suitable number). The processors 810A-810N may be any suitable processor capable of executing instructions. For example, in various implementations, the processors 810A-810N may be general-purpose or embedded processors implementing any of a variety of instruction set architectures (ISAs), such as the x86, PowerPC, SPARC, or MIPS ISAs, or any other suitable ISA. In multiprocessor systems, each of the processors 810A-810N may commonly, but not necessarily, implement the same ISA.

The non-transitory computer-readable storage medium 820 may be configured to store executable instructions and/or data accessible by the one or more processors 810A-810N. In various implementations, the non-transitory computer-readable storage medium 820 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 820 as program instructions 825 and data storage 835, respectively. In other implementations, program instructions and/or data may be received, sent or stored upon different types of computer-accessible media, such as non-transitory media, or on similar media separate from the non-transitory computer-readable storage medium 820 or the control system 800. Generally speaking, a non-transitory, computer-readable storage medium may include storage media or memory media such as magnetic or optical media, e.g., disk or CD/DVD-ROM, coupled to the control system 800 via the I/O interface 830. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 840.

In one implementation, the I/O interface 830 may be configured to coordinate I/O traffic between the processors 810A-810N, the non-transitory computer-readable storage medium 820, and any peripheral devices, including the network interface 840 or other peripheral interfaces, such as input/output devices 850. In some implementations, the I/O interface 830 may perform any necessary protocol, timing or other data transformations to convert data signals from one component (e.g., non-transitory computer-readable storage medium 820) into a format suitable for use by another component (e.g., processors 810A-810N). In some implementations, the I/O interface 830 may include support for devices attached through various types of peripheral buses, such as a variant of the Peripheral Component Interconnect (PCI) bus standard or the Universal Serial Bus (USB) standard, for example. In some implementations, the function of the I/O interface 830 may be split into two or more separate components, such as a north bridge and a south bridge, for example. Also, in some implementations, some or all of the functionality of the I/O interface 830, such as an interface to the non-transitory computer-readable storage medium 820, may be incorporated directly into the processors 810A-810N.

The network interface 840 may be configured to allow data to be exchanged between the control system 800 and other devices attached to a network, such as other control systems, other computer systems, imaging or video data processing systems, audio data processing systems, facial keypoint estimation or generation systems, two-dimensional texture warping or transformation systems, three-dimensional model reorientation systems, mouth interior selection, application, and blending systems, post-processing systems, or between nodes of the control system 800. In various implementations, the network interface 840 may support communication via wired or wireless general data networks, such as any suitable type of Ethernet network.

Input/output devices 850 may, in some implementations, include one or more displays, projection devices, cameras, other visual input/output devices, microphones, speakers, other audio input/output devices, keyboards, keypads, touchpads, scanning devices, imaging devices, sensors, voice or optical recognition devices, or any other devices suitable for entering or retrieving data by one or more control systems 800. Multiple input/output devices 850 may be present in the control system 800 or may be distributed on various nodes of the control system 800. In some implementations, similar input/output devices may be separate from the control system 800 and may interact with one or more nodes of the control system 800 through a wired or wireless connection, such as over the network interface 840.

As shown in FIG. 8, the memory 820 may include program instructions 825 that may be configured to implement one or more of the described implementations and/or provide data storage 835, which may comprise various tables, data stores and/or other data structures accessible by the program instructions 825. The program instructions 825 may include various executable instructions, programs, or applications to facilitate synthetic lip synchronization generation operations and processes described herein, such as imaging or video data processing controllers, drivers, or applications, audio data processing controllers, drivers, or applications, facial keypoint estimation or generation controllers, drivers, or applications, two-dimensional texture warping or transformation controllers, drivers, or applications, three-dimensional model reorientation controllers, drivers, or applications, mouth interior selection, application, and blending controllers, drivers, or applications, post-processing controllers, drivers, or applications, etc. The data storage 835 may include various data stores for maintaining data related to systems, operations, or processes described herein, such as video data, audio data, face models, facial keypoints, surface textures or features, texture warping, mouth interior portions, etc.

The control system 800 may also include a separate or dedicated source video-based keypoint estimator 832 that may be configured to generate source face models having source facial keypoints based on source videos. In addition, the control system 800 may also include a separate or dedicated target audio-based keypoint estimator 834 that may be configured to generate target face models having target facial keypoints based on target audio tracks. Further, the control system 800 may also include a separate or dedicated keypoint two-dimensional transformation algorithm 836 that may be configured to transform or warp facial keypoints and associated surfaces in two-dimensional space from source face models to target face models. Moreover, the control system 800 may also include a separate or dedicated best matching mouth interior algorithm 838 that may be configured to identify, select, apply, and/or blend best or good matching mouth interior portions with target frames of target videos that have been transformed or warped to match target audio tracks.

Those skilled in the art will appreciate that the control system 800 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 800 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow chart shown in FIG. 7, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
   receiving, by a control system, a source video including a representation of a face, the source video including a plurality of source frames associated with a first audio track in a first language;
   generating, by the control system for each of the plurality of source frames, a source face model having a first plurality of keypoints based on the face represented in the plurality of source frames of the source video;
   receiving, by the control system, a target audio track in a second language that is different than the first language;
   generating, by the control system for each of a plurality of target frames, a target face model having a second plurality of keypoints based on the target audio track;
   determining, by the control system for corresponding pairs of the plurality of source frames and the plurality of target frames, respective distances between corresponding pairs of the first plurality of keypoints and the second plurality of keypoints;
   causing, by the control system for the corresponding pairs of the plurality of source frames and the plurality of target frames, two-dimensional transformations via texture warping of surfaces associated with the corresponding pairs of the first plurality of keypoints to the second plurality of keypoints based on the respective distances;
   identifying, by the control system for the plurality of target frames, a respective best matching mouth interior based on the plurality of source frames of the source video;
   causing, by the control system for the plurality of target frames, application of the respective best matching mouth interior to respective target frames;
   causing, by the control system for the plurality of target frames, blending of the respective best matching mouth interior and corresponding warped surfaces for respective target frames; and
   generating, by the control system, a target video including the plurality of target frames having the corresponding warped surfaces based on the target audio track in the second language and respective best matching mouth interiors.

2. The computer-implemented method of claim 1, wherein the two-dimensional transformations via texture warping comprise two-dimensional affine transformations of the surfaces associated with the first plurality of keypoints to the second plurality of keypoints.

3. The computer-implemented method of claim 1, wherein the two-dimensional transformations via texture warping substantially maintain textures of the surfaces associated with the first plurality of keypoints based on the source video.

4. The computer-implemented method of claim 1, further comprising:
   identifying, by the control system, a first subset of fixed keypoints from the first plurality of keypoints of the source face model;
   identifying, by the control system, a second subset of fixed keypoints from the second plurality of keypoints of the target face model that correspond to the first subset of fixed keypoints; and
   causing, by the control system for corresponding pairs of the first subset of fixed keypoints and the second subset of fixed keypoints, three-dimensional transformations of the second subset of fixed keypoints to the first subset of fixed keypoints to align a three-dimensional pose of the target face model with a three-dimensional pose of the source face model.

5. A method, comprising:
   receiving, by a control system, a source video including a representation of a face, the source video including a plurality of source frames associated with a first audio track in a first language;
   causing, by the control system for individual frames of the plurality of source frames, generation of a source model having a first plurality of keypoints based on the face represented in the plurality of source frames of the source video;
   receiving, by the control system, a target audio track in a second language;
   causing, by the control system for individual frames of a plurality of target frames, generation of a target model having a second plurality of keypoints based on the target audio track;
   determining, by the control system for corresponding pairs of the plurality of source frames and the plurality of target frames, respective distances between corresponding pairs of the first plurality of keypoints and the second plurality of keypoints;
   causing, by the control system for the plurality of target frames, two-dimensional texture warping of surfaces associated with the corresponding pairs of the first plurality of keypoints to the second plurality of keypoints based on the respective distances; and
   causing, by the control system, generation of a target video including the plurality of target frames having corresponding warped surfaces based on the target audio track.

6. The method of claim 5, wherein a corresponding plurality of frames of the source model is generated by a facial keypoint estimator based on the face represented in the plurality of source frames of the source video.

7. The method of claim 5, wherein the plurality of target frames of the target model is generated by a facial keypoint estimator based on sounds included in the target audio track.

8. The method of claim 5, wherein the first plurality of keypoints includes a first set of movable keypoints and a first set of fixed keypoints; and
   wherein the second plurality of keypoints includes a second set of movable keypoints and a second set of fixed keypoints.

9. The method of claim 8, further comprising:
   causing, by the control system for corresponding pairs of the first set of fixed keypoints and the second set of fixed keypoints, three-dimensional transformations of the second set of fixed keypoints to the first set of fixed keypoints to align a three-dimensional pose of the target model with a three-dimensional pose of the source model.

10. The method of claim 8, wherein the respective distances are determined between corresponding pairs of the first set of movable keypoints and the second set of movable keypoints.

11. The method of claim 10, wherein the two-dimensional texture warping is performed for the surfaces associated with the corresponding pairs of the first set of movable keypoints to the second set of movable keypoints based on the respective distances.

12. The method of claim 11, wherein the two-dimensional texture warping comprises two-dimensional affine transformations of the surfaces associated with the first set of movable keypoints to the second set of movable keypoints.

13. The method of claim 11, wherein the first set of movable keypoints form a first set of triangles, and the second set of movable keypoints form a second set of triangles; and
wherein the two-dimensional texture warping comprises warping of the surfaces associated with the first set of triangles to the second set of triangles.

14. The method of claim 11, wherein the two-dimensional texture warping substantially maintains textures of the surfaces associated with the first set of movable keypoints based on the source video.

15. The method of claim 5, further comprising:
identifying, by the control system for the plurality of target frames, a respective best matching mouth interior based on the plurality of source frames of the source video;
causing, by the control system for the plurality of target frames, application of the respective best matching mouth interior to respective target frames; and
causing, by the control system for the plurality of target frames, blending of the respective best matching mouth interior and the corresponding warped surfaces for respective target frames.

16. A non-transitory, computer-readable medium storing executable instructions that, when executed by one or more processors, cause the one or more processors to, at least:
receive a source video including a representation of a face, the source video including a plurality of source frames associated with a first audio track in a first language;
cause, for individual frames of the plurality of source frames, generation of a source model having a first plurality of keypoints based on the face represented in the plurality of source frames of the source video;
receive a target audio track in a second language;
cause, for individual frames of a plurality of target frames, generation of a target model having a second plurality of keypoints based on the target audio track;
determine, for corresponding pairs of the plurality of source frames and the plurality of target frames, respective distances between corresponding pairs of the first plurality of keypoints and the second plurality of keypoints;
cause, for the plurality of target frames, two-dimensional texture warping of surfaces associated with the corresponding pairs of the first plurality of keypoints to the second plurality of keypoints based on the respective distances; and
cause generation of a target video including the plurality of target frames having corresponding warped surfaces based on the target audio track.

17. The non-transitory, computer-readable medium of claim 16, wherein the executable instructions, when executed by the one or more processors, further cause the one or more processors to:
identify a first subset of fixed keypoints from the first plurality of keypoints of the source model; and
identify a second subset of fixed keypoints from the second plurality of keypoints of the target model that correspond to the first subset of fixed keypoints.

18. The non-transitory, computer-readable medium of claim 17, wherein the executable instructions, when executed by the one or more processors, further cause the one or more processors to:
cause, for corresponding pairs of the first subset of fixed keypoints and the second subset of fixed keypoints, three-dimensional transformations of the second subset of fixed keypoints to the first subset of fixed keypoints to align a three-dimensional pose of the target model with a three-dimensional pose of the source model.

19. The non-transitory, computer-readable medium of claim 16, wherein the two-dimensional texture warping comprises two-dimensional affine transformations of the surfaces associated with the first plurality of keypoints and an associated first set of triangles to the second plurality of keypoints and an associated second set of triangles.

20. The non-transitory, computer-readable medium of claim 16, wherein the executable instructions, when executed by the one or more processors, further cause the one or more processors to:
identify, for the plurality of target frames, a respective best matching mouth interior based on the plurality of source frames of the source video;
cause, for the plurality of target frames, application of the respective best matching mouth interior to respective target frames; and
cause, for the plurality of target frames, blending of the respective best matching mouth interior and the corresponding warped surfaces for respective target frames.

* * * * *